Feb. 5, 1946. F. E. BAUMGARTNER 2,393,957
GREASE TRAP FOR RANGE HOODS
Filed Oct. 19, 1944
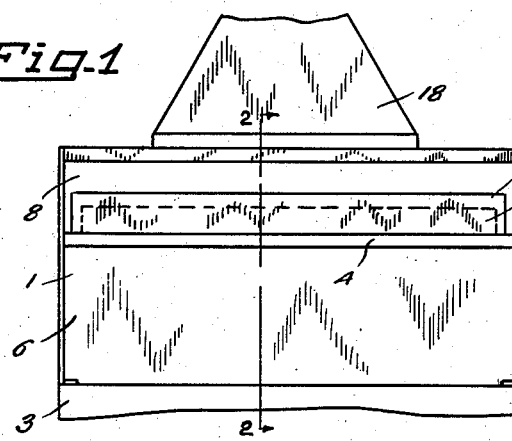
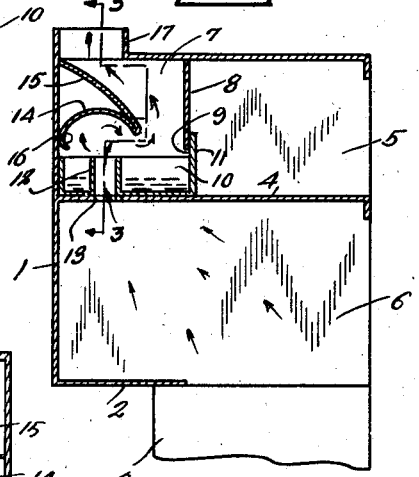
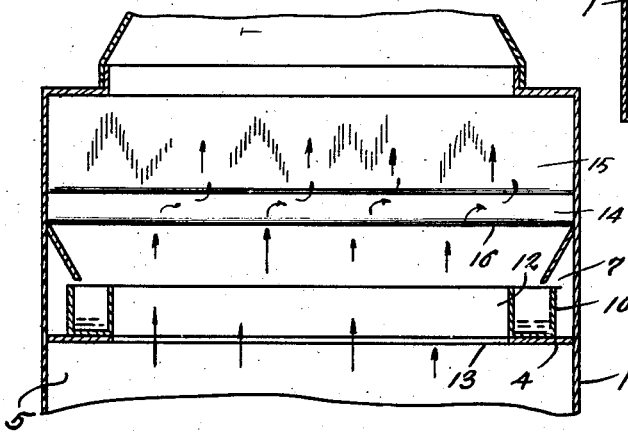
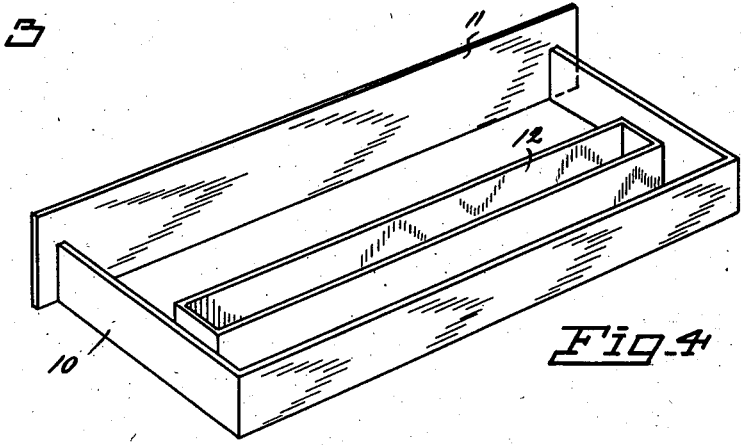
Inventor
Frank E. Baumgartner
By
Attorney Patented Feb. 5, 1946

2,393,957

UNITED STATES PATENT OFFICE 2,393,957

GREASE TRAP FOR RANGE HOODS

Frank E. Baumgartner, Spokane, Wash.

Application October 19, 1944, Serial No. 559,377

4 Claims. (Cl. 126—299)

This invention relates to a range of the type used in kitchens and provided with an overhead hood for catching smoke rising from the range. This smoke contains grease which is suspended in the smoke and passes from the hood with the smoke. Since the grease is suspended in the smoke it gathers on the inner surface of the hood and the flue leading therefrom to a chimney, and soot will adhere to the greasy surfaces and soon cause them to be coated with a thick layer of greasy soot which is hard to remove and also constitutes a fire hazard.

Therefore, one object of the invention is to provide a device which may be mounted over the hood in such relation to the smoke outlet opening thereof that smoke will pass through the device and grease be removed from the smoke.

Another object of the invention is to provide and device with a pan for receiving the grease which is removably mounted so that when it becomes filled with grease it may be removed and grease emptied from it.

Another object of the invention is to provide a device of this character wherein a housing is divided to provide a chamber through which the smoke passes and in which the grease pan is removably supported by a horizontal partition in the body forming a bottom for the chamber and also having a portion projecting forwardly from the chamber and serving as a shelf upon which dishes may be placed and warmed.

Another object of the invention is to provide within the chamber a baffle disposed over the pan in such position that as smoke rises from a throat in the pan it will strike the baffle and thus cause grease in the smoke to gather against the under surface of the baffle and drip from the baffle into the pan.

Another object of the invention is to so form the baffle that grease gathering thereon will flow toward front and rear edges of the baffle and drip therefrom into the pan.

Another object of the invention is to so form the pan that its front wall will form a closure for an opening at the front of the chamber and through which the pan is thrust into and removed from the chamber.

Another object of the invention is to provide a grease trap which may be formed of sheet metal and very cheaply manufactured.

In the accompanying drawing:

Fig. 1 is a front view of the grease trap.

Fig. 2 is a sectional view taken transversely through the grease trap on the line 2—2 of Fig. 1.

Fig. 3 is a sectional view on the line 3—3 of Fig. 2.

Fig. 4 is a perspective view of the grease pan.

This grease trap has a housing 1 formed of sheet metal and open at its front, as shown in Fig. 2. The bottom 2 of the housing terminates in rearwardly spaced relation to the open front of the housing, thus providing an inlet through which smoke in the hood 3 of a cook stove may enter the housing. Smoke rising from the stove may also enter the housing through the open front thereof and the bottom 2 may serve as a shelf upon which dishes to be warmed may be placed. A partition 4 extends horizontally in the housing in spaced relation to the top and bottom thereof and divides the housing into upper and lower compartments 5 and 6. This partition forms a bottom for a chamber 7 at the rear of the upper compartment which is defined by a vertical partition 8 constituting a front wall for the chamber 7. This wall 8 extends the full width of the housing but is of such depth that its lower edge is spaced upwardly from the partition 4 and provided with an opening under the wall through which a grease pan 10 may be inserted and removed.

The pan is formed of sheet metal and has a front wall 11 of greater width than the pan and projecting upwardly therefrom, as shown in Fig. 4, so that when the pan is thrust under the wall 8 and into the chamber 7, the wall 11 will overlap the outer front face of the wall 8 and constitute a closure for the opening 9. An upstanding throat 12 extends transversely in the pan in surrounding relation to an opening formed in the bottom of the pan and when the pan is in place within the chamber 7, the throat registers with an opening 13 formed through the portion of the partition which serves as a bottom for the chamber 7. By this arrangement, the smoke entering the lower compartment 6 may follow the path of the arrows in Fig. 2, and flow upwardly through the throat and into the chamber 7, where it will strike a baffle 14. This baffle is formed integral with a mounting plate 15 which is firmly secured against the rear wall of the housing and abuts the top wall of the housing. The baffle is upwardly bowed in transverse cross section with its concave surface presented downwardly, as shown in Fig. 2, and referring to this figure, it will be seen that the rear side portion of the baffle plate bears against the rear wall of the housing and projects forwardly therefrom to form a lip 16. When the smoke strikes the under face of the baffle grease in the smoke will gather against the baffle and run towards its front and rear edges and drip therefrom into the pan, where it gradually fills the pan. The smoke moves forwardly from under the baffle and then flows upwardly over plate 15 and out through the neck 17 and upwardly through a flue 18 fitting about the neck and leading to a chimney. After the pan has become filled with grease it is withdrawn through opening 9, the grease emptied from the pan, and the pan replaced. Therefore, the grease will be prevented from accumulating in the flue and causing soot to adhere to a greasy surface and quickly clog the flue. This also prevents the chimney from becoming covered with a thick coating of grease and soot to form a fire hazard.

Having thus described the invention, what is claimed is:

1. A device of the character described, comprising a housing adapted to be mounted upon a hood of a cook stove, said housing being open at its front and having its bottom formed with an opening communicating with a smoke passage of the hood, a horizontal partition in said housing defining upper and lower compartments and constituting a shelf, a vertical transversely extending wall depending from the top of said housing forwardly of the rear wall of the housing with its lower edge spaced upwardly from the shelf and constituting a front wall for a rear chamber, there being a smoke outlet at the top of the rear chamber and an inlet at the bottom thereof, a grease pan resting upon said horizontal partition and slidable into the rear chamber with its front wall closing the space under the rear chamber front wall, a throat in said pan open at its top and bottom and registering with the smoke inlet at the bottom of the rear chamber, and a baffle projecting forwardly from the rear wall of the rear chamber over said pan for contact by smoke rising from said throat to remove grease from the smoke and drip the grease into said pan.

2. A device of the character described comprising a housing adapted to be mounted upon a hood of a cook stove, said housing being open at its front and having its bottom formed with an opening for communicating with a smoke passage of the hood, a horizontal partition in said housing defining upper and lower compartments and constituting a shelf, a vertical transversely extending wall depending from the top of said housing forwardly of the rear wall of the housing with its lower edge spaced upwardly from the shelf and constituting a front wall for a rear chamber, there being a smoke outlet at the top of the rear chamber and an inlet at the bottom thereof, a grease pan resting upon the bottom of the rear chamber and inserted and removed through the opening under the front wall, and a baffle in the rear chamber under the outlet and extending over said pan for removing grease from smoke moving toward the outlet and dripping the grease into said pan.

3. A device of the character described, comprising a housing adapted to be mounted upon a hood of a cook stove, said housing being open at its front and having its bottom formed with an opening communicating with a smoke passage of the hood, a horizontal partition in said housing defining upper and lower compartments and constituting a shelf, a vertical transversely extending wall depending from the top of said housing forwardly of the rear wall of the housing with its lower edge spaced upwardly from the shelf and constituting a front wall for a rear chamber, there being a smoke outlet at the top of the rear chamber and an inlet at the bottom thereof, a grease pan resting upon said horizontal partition and slidable into the rear chamber with its front wall closing the space under the rear chamber front wall, a throat in said pan open at its top and bottom and registering with the smoke inlet at the bottom of the rear chamber, and a baffle extending horizontally in the rear chamber over said pan between the throat and the outlet, said baffle serving to remove grease from smoke flowing from said throat and being provided with a transversely concave lower surface from which grease drips into the pan.

4. A device of the character described comprising a housing adapted to be mounted upon a hood of a cook stove, said housing being open at its front and having its bottom formed with an opening constituting a smoke passage communicating with a smoke passage of the hood, a horizontal partition in said housing formed with an opening constituting a smoke passage, the top of the housing being formed with an outlet for smoke, a removable grease receptacle in said housing resting upon said partition under the smoke outlet in the top thereof and provided with a throat open at upper and lower ends and registering with the opening in the partition, and a baffle in said housing mounted above said receptacle and overhanging the throat for catching grease in the smoke and depositing the grease in the receptacle.

FRANK E. BAUMGARTNER.